(12) United States Patent
Wu

(10) Patent No.: US 11,223,216 B2
(45) Date of Patent: Jan. 11, 2022

(54) ARBITRARY RAPID-CHARGING APPARATUS AND METHOD

(71) Applicant: SHENZHEN DESHEN TONG TRADING CO, LTD, Shenzhen (CN)

(72) Inventor: Yuchun Wu, Jiangsu (CN)

(73) Assignee: SHENZHEN DESHEN TONG TRADING CO, LTD, Shenzhen (CN)

( * ) Notice: Subject to any disclaimer, the term of this patent is extended or adjusted under 35 U.S.C. 154(b) by 176 days.

(21) Appl. No.: 16/550,270

(22) Filed: Aug. 25, 2019

(65) Prior Publication Data

US 2020/0036200 A1 Jan. 30, 2020

Related U.S. Application Data

(63) Continuation of application No. PCT/CN2018/082141, filed on Apr. 8, 2018.

(30) Foreign Application Priority Data

Feb. 25, 2017 (CN) .......................... 201710106020.0

(51) Int. Cl.
*H02J 7/00* (2006.01)
*H01M 10/42* (2006.01)
*H01M 10/44* (2006.01)

(52) U.S. Cl.
CPC ......... *H02J 7/0036* (2013.01); *H01M 10/425* (2013.01); *H01M 10/44* (2013.01); *H02J 7/00* (2013.01); *H02J 7/0045* (2013.01); *H01M 2010/4271* (2013.01); *H01M 2010/4278* (2013.01)

(58) Field of Classification Search
USPC ....................................................... 320/107
See application file for complete search history.

(56) References Cited

U.S. PATENT DOCUMENTS

| 2013/0234661 A1* | 9/2013 | Yang | H02J 50/80 320/108 |
|---|---|---|---|
| 2015/0263550 A1* | 9/2015 | Han | H02J 7/0014 320/108 |

FOREIGN PATENT DOCUMENTS

| CN | 102470776 A | 5/2012 |
|---|---|---|
| CN | 103066340 A | 4/2013 |
| CN | 104092274 A | 10/2014 |
| CN | 104953629 A | 9/2015 |
| CN | 105161941 A | 12/2015 |
| CN | 106899056 A | 6/2017 |
| CN | 206834767 U | 1/2018 |
| WO | WO2014/059050 A1 | 4/2014 |

OTHER PUBLICATIONS

International Search Report of PCT/CN2018/082141.

\* cited by examiner

*Primary Examiner* — Bryce M Aisaka

(57) ABSTRACT

The present disclosure relates to the field of electronic device accessories, and in particular, to a random quick-charging apparatus and method. The random quick-charging apparatus and method of the present disclosure do not require a fixed quick-charging interface, an electronic device may be randomly inserted into any interface to achieve a quick-charging function, and thus high convenience in use is achieved.

9 Claims, 4 Drawing Sheets

ARBITRARY RAPID-CHARGING APPARATUS AND METHOD

TECHNICAL FIELD

The present disclosure relates to the field of electronic circuits, and in particular, to a random quick-charging apparatus and method.

BACKGROUND

With the development of science and technology, electronic devices have been frequently used in people's daily life. The electronic devices consume power particularly quickly, and hence need to be charged frequently and quickly.

Each of all existing charging apparatuses is provided with one fixed quick-charging interface for quick charging of the electronic device, but it is difficult for a user to distinguish which one is the quick-charging interface and which one is not the quick-charging interface when it is inconvenient to distinguish. For example, when driving a vehicle, the user needs to pay attention to road conditions at all times, and thus it is difficult to determine which one is the quick-charging interface of the charging apparatus. Thus, the problem of inconvenience in use of the existing charging apparatus has become a crucial problem urgently to be solved in people's daily life.

SUMMARY

Regarding the problem of inconvenience in use of the existing charging apparatus, the present disclosure provides a random quick-charging apparatus and method.

A solution of the present disclosure to solve the technical problem is to provide a random quick-charging apparatus for quick charging of an electronic device. The random quick-charging apparatus comprises at least two branches, a power supply unit, a detection unit, and a controller, wherein the at least two branches are electrically connected to the power supply unit; the detection unit is electrically connected to the controller; the controller is electrically connected to the power supply unit; an interface is arranged on each branch; the detection unit detects whether there is an electronic device electrically inserted into the interface of any branch and generates a feedback signal for transmission to the controller; the controller controls the power supply unit to perform handshake identification with the electronic device inserted into the interface of any branch; and the power supply unit correspondingly outputs a power source signal according to quick-charging demands of the electronic device.

Preferably, when a second electronic device is inserted into the other interface, the detection unit detects the insertion of the second electronic device and generates a feedback signal for transmission to the controller; and the controller controls, according to the feedback signal, a power source signal output by the power supply unit to be a conventional power source signal.

Preferably, the random quick-charging apparatus comprises at least three branches, wherein when a third electronic device is inserted, the detection unit detects the electrical insertion of the third electronic device and generates a feedback signal to the controller; and the controller controls, according to the feedback signal, the power supply unit to directly output a conventional power source signal.

Preferably, the number of the detection units is at least two; one detection unit is arranged on each branch; the detection unit is connected to the interface at one end and connected to the power supply unit at the other end; and the detection unit detects whether there is an electronic device electrically inserted into the interface of the branch where the detection unit is located.

Preferably, the interface comprises four electrodes, i.e., D+, D−, V+, and V−; the D+, D−, V+, and V− electrodes are sequentially connected to the detection unit and the power supply unit; and the D+, D−, V+, and V− electrodes of each interface are co-connected to D+, D−, V+, and V− electrodes of the other interface in a one-to-one correspondence manner; or the interface comprises six electrodes, i.e., D+, D−, V+, V−, CC1 and CC2; the D+, D−, V+, V−, CC1 and CC2 electrodes are sequentially connected to the detection unit and the power supply unit; and the D+, D−, V+, V−, CC1 and CC2 electrodes of each interface are co-connected to D+, D−, V+, V−, CC1 and CC2 electrodes of the other interface in a one-to-one correspondence manner.

Preferably, the power supply unit performs handshake identification with a first electronic device inserted into the interface of any branch, and when the first electronic device supports quick charging, the power supply unit correspondingly outputs a power source signal according to quick-charging demands of the electronic device; and when the first electronic device does not support quick charging, the power supply unit cannot acquire the quick-charging demands of the electronic device, outputs a conventional power source signal to the electronic device and thus performs ordinary charging on the inserted electronic device.

Preferably, the random quick-charging apparatus is a mobile power source or a vehicle-mounted charger.

Preferably, the electronic device is a mobile phone, rechargeable earphones, a tablet computer or a laptop computer.

The present disclosure further provides a random quick-charging method for quick charging of an electronic device. The random quick-charging method comprises the following steps: detecting an electronic device which is randomly and electrically inserted; performing handshake identification with the electronic device randomly inserted so as to acquire quick-charging demands of the electronic device; and correspondingly outputting a power source signal according to the quick-charging demands of the electronic device.

Preferably, the random quick-charging method further comprises the following steps: detecting the electrical insertion of a first electronic device; and correspondingly outputting a power source signal according to quick-charging demands of the electronic device.

Preferably, the random quick-charging method further comprises the following steps: detecting the electrical insertion of a second electronic device; and outputting a conventional power source signal.

Preferably, the random quick-charging method further comprises the following steps: detecting the electrical insertion of an N-th (N>2, and N is an integer) electronic device; and outputting a conventional power source signal.

Compared with the prior art, the random quick-charging apparatus for quick charging of the electronic device of the present disclosure comprises the at least two branches, the power supply unit, the detection unit, and the controller, wherein the at least two branches are electrically connected to the power supply unit; the detection unit is electrically connected to the controller; the controller is electrically connected to the power supply unit; the interface is arranged on each branch; the detection unit detects whether there is the electronic device electrically inserted into the interface of any branch and generates the feedback signal for transmission to the controller; the controller controls the power supply unit to perform handshake identification with the electronic device inserted into the interface of any branch; and the power supply unit correspondingly outputs the power source signal according to the quick-charging demands of the electronic device. The electronic device may be randomly inserted into any interface of the random quick-charging apparatus to achieve the quick-charging function without being inserted into a fixed interface to achieve the quick charging, and thus high convenience in use is achieved. Particularly in the field of vehicle-mounted chargers, it is inconvenient for a user to distinguish which one is the designated quick-charging interface and which one is not the quick-charging interface when the user is driving a vehicle, but the random quick-charging apparatus of the present disclosure provides a blind insertion mode, and thus the user may use the charging apparatus more conveniently and safely.

In addition, for the random quick-charging apparatus of the present disclosure, when the second electronic device is inserted into the other interface, the detection unit detects the insertion of the second electronic device and generates the feedback signal for transmission to the controller; and the controller controls, according to the feedback signal, the power source signal output by the power supply unit to be the conventional power source signal. The random quick-charging apparatus of the present disclosure may not only guarantee the quick-charging function, but also avoid the occurrence of an unsafe accident of charging apparatus explosion or user burn caused by too high output power and excessive generated heat energy when a plurality of interfaces is used for quick charging at the same time, and thus has high safety performance.

Compared with the prior art, the random quick-charging method for quick charging of the electronic device of the present disclosure comprises the following steps: detecting the electronic device which is randomly and electrically inserted; performing handshake identification with the electronic device randomly inserted so as to acquire the quick-charging demands of the electronic device; and correspondingly outputting the power source signal according to the quick-charging demands of the electronic device.

By adopting the random quick-charging method of the present disclosure, the electronic device may be randomly inserted to achieve the quick-charging function without being inserted into the fixed quick-charging interface to achieve the quick charging and thus high convenience in use is achieved. In addition, the present disclosure also provides such a solution that the charging demands of a device to be charged under a specific protocol are confirmed according to a feedback signal after the device to be charged is inserted, and then different voltage signals may be provided for charging apparatuses operating under different charging protocols.

In addition, in the random quick-charging method of the present disclosure, when it is detected that more than one electronic devices are inserted at the same time, the conventional power source signal is output, thereby avoiding the safety problems of fire breakout, explosion and the like caused by too high output power and excessive generated heat energy of the power source when two or more electronic devices are quickly charged at the same time, and the random quick-charging method has high safety performance.

DETAILED DESCRIPTION

In order to make the objectives, technical solutions and advantages of the present disclosure clearer, the present disclosure is further illustrated in detail below with reference to the accompanying drawings and embodiments. It should be understood that the specific embodiments described herein are only intended to explain rather than limit the present disclosure.

Figure 1:
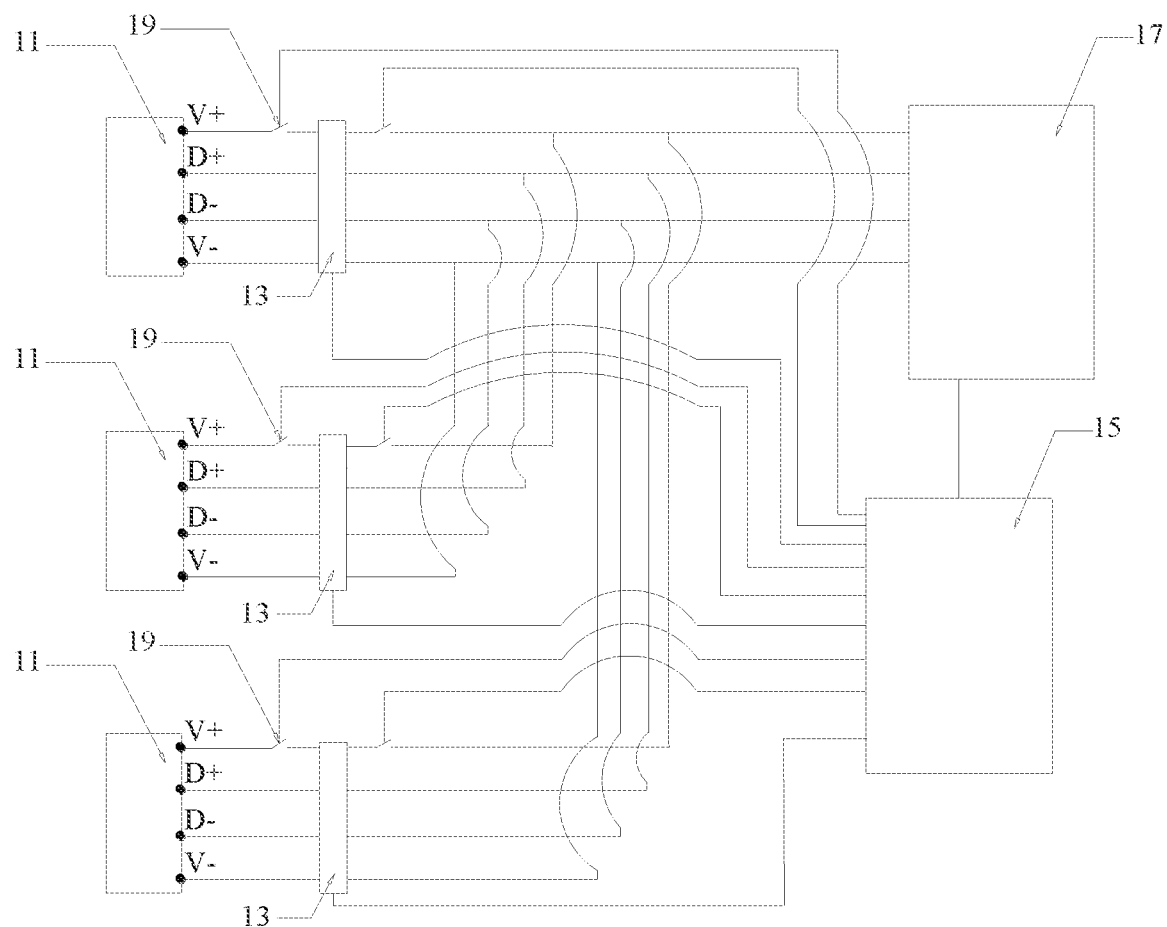
FIG. 1 is a structural diagram of a random quick-charging apparatus of the present disclosure.

With reference to FIG. 1, a random quick-charging apparatus 10 for quick charging of an electronic device of the present disclosure comprises at least two branches, a power supply unit 17, and a controller 15, wherein the at least two branches are co-connected and then electrically connected to the power supply unit 17. In the present disclosure, the term "co-connected" refers to that the at least two branches are converged on one of the branches firstly and then connected to other units. The controller 15 is electrically connected to the power supply unit 17 and may control the power supply unit 17 to adjust a power source signal output by the random quick-charging apparatus 10. An interface 11 and a detection unit 13 are arranged on each branch. The detection unit 13 is connected to the interface 11 at one end and connected to the power supply unit 17 at the other end. The detection unit 13 is further connected to the controller 15. The detection unit 13 may detect whether an electronic device is electrically inserted into the interface 11 of the branch where the detection unit is located and feeds back a detection result to the controller 15. After receiving a feedback signal from the detection unit 13, the controller 15 controls the power supply unit 17 to adjust the power source signal of the random quick-charging apparatus 10. The power supply unit 17 outputs a corresponding power source signal according to quick-charging demands of the electronic device. Preferably, the random quick-charging apparatus 10 may provide two ultra-high output voltages of 12V and 24V, has output power up to 36 W, can withstand a voltage exceeding 40V, and has the advantages of high charging speed and high safety. The controller 15 may control the power supply unit 17 to perform handshake identification with the electronic device inserted into any branch. The power supply unit 17 correspondingly outputs the power source signal according to the quick-charging demands of the electronic device inserted into any branch to achieve quick charging. Preferably, a power source management module (not shown) is arranged in the power supply unit 17, may perform handshake identification with the electronic device and control the output of the corresponding power source signal. Therefore, the electronic device may be randomly inserted into the interface 11 of one branch. The detection unit 13 on the branch where the interface 11 is located detects that there is the electronic device electrically inserted and feeds back the detection result to the power supply unit 17. The power supply unit 17 performs handshake identification with the electronic device, and correspondingly outputs the power source signal according to the quick-charging demands of the electronic device, thereby achieving quick charging of the electronic device. The random quick-charging apparatus 10 of the present disclosure has the advantages that there is no need to fixedly arrange a quick-charging interface to achieve quick charging, and the electronic device may be randomly inserted into any interface 11 to achieve the quick-charging function, thereby achieving high convenience in use. The power supply unit 17 may be a power source adapter, a rechargeable battery, or other devices that may provide electrical energy. In the embodiment of the present disclosure, the power source signal is a voltage and/a current. In the present disclosure, the random quick-charging apparatus 10 is preferably a mobile power source or a vehicle-mounted charger, and the electronic device is preferably a mobile phone, rechargeable earphones, a tablet computer, a laptop computer or the other device that is charged movably.

When the interface 11 is a USB Type-A interface, the interface 11 of each branch is provided with four electrodes, i.e., D+, D−, V+, and V−. The power source signal takes a path where each of the V+ and V− electrodes is located and a data signal takes a path where each of the D+ and D− electrode is located. Both the power source signal and the data signal are firstly transferred to the detection unit 13 from the interface 11 and then are transferred to the power supply unit 17. The power supply unit 17 may identify a quick-charging protocol of the electronic device by collecting a current on the path where each of the V+ and V− electrodes is located, and correspondingly output the power source signal according to the quick-charging demands of the electronic device so as to achieve quick charging of the electronic device. Preferably, after being connected to the detection unit 13, the paths where the D+, D−, V+, and V− electrodes of each interface 11 are located respectively are co-connected to paths where D+, D−, V+, and V− electrodes of the other interface 11 are located respectively in a one-to-one correspondence manner.

A switch 19 is arranged on the path where each of the V+ and/or V− electrodes is located. When the power supply unit 17 performs handshake identification with the electronic device inserted into the interface 11 by collecting the current of the path where each of the V+ and V− electrodes is located, the switch 19 is in an on-state. When the power supply unit 17 performs handshake identification with the electronic device inserted into the interface 11 by collecting voltages at two ends of each of the D+ and D− electrodes, the switch 19 is in an off-state. Preferably, each branch is provided with one switch 19 at each of positions before and after the position of the detection unit 13, thereby ensuring that the communications on the paths where the V+ and/or V− electrodes of each interface 11 are located do not interfere with each other. The switch 19 is preferably an MOS transistor. Further preferably, a P-type MOS transistor is arranged on the path where the V+ electrode is located, and an N-type MOS transistor is arranged on the path where the V− electrode is located.

Figure 2:
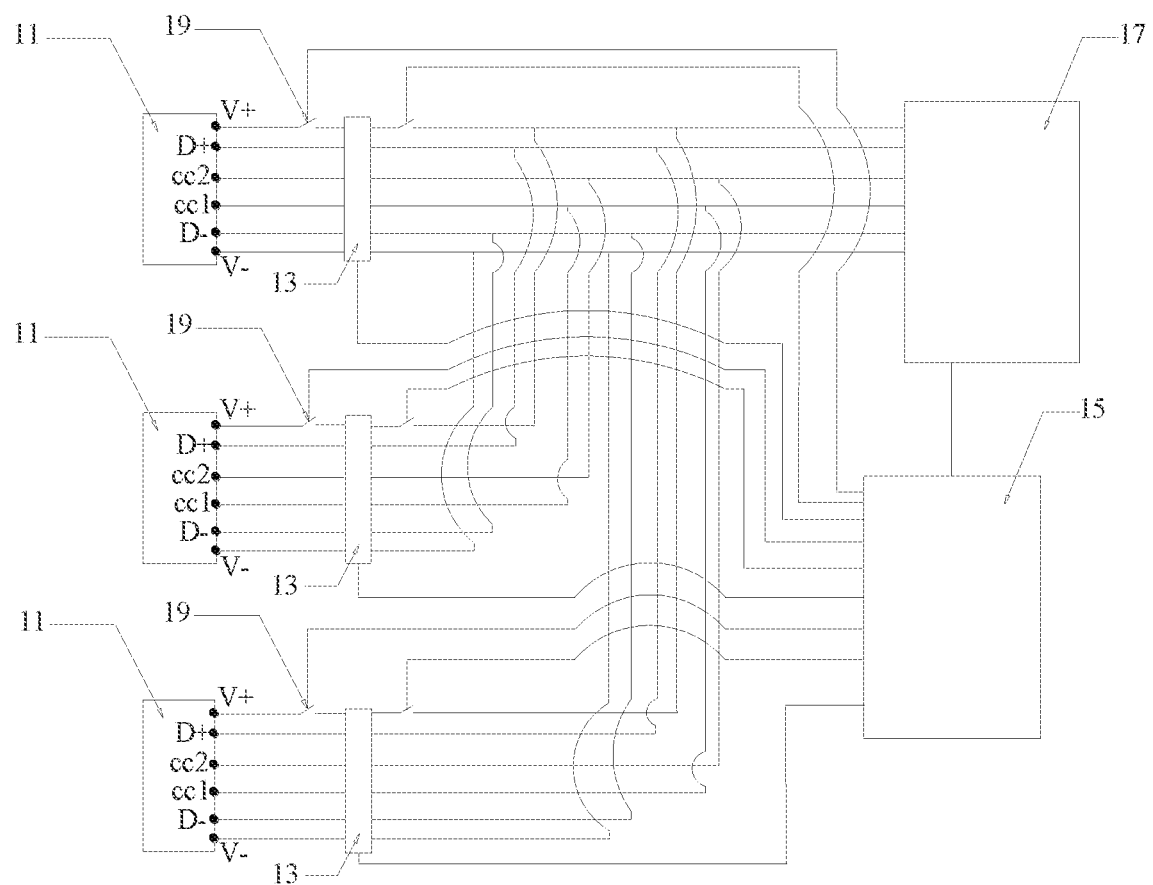
FIG. 2 is a structural diagram of a modified embodiment of the random quick-charging apparatus of the present disclosure.

With reference to FIG. 2, as a variant, when the interface 11 is a USB type-C interface, the interface 11 further comprises a CC1 electrode and a CC2 electrode. The data signal takes a path where each of the CC1 electrode and the CC2 electrode is located. The power supply unit 17 may identify the quick-charging protocol of the electronic device by collecting voltages at two ends of each of the CC1 and CC2 electrodes. At this time, the switch on the path where the V+ and/or V− electrodes are located is in the off-state.

Figure 3:
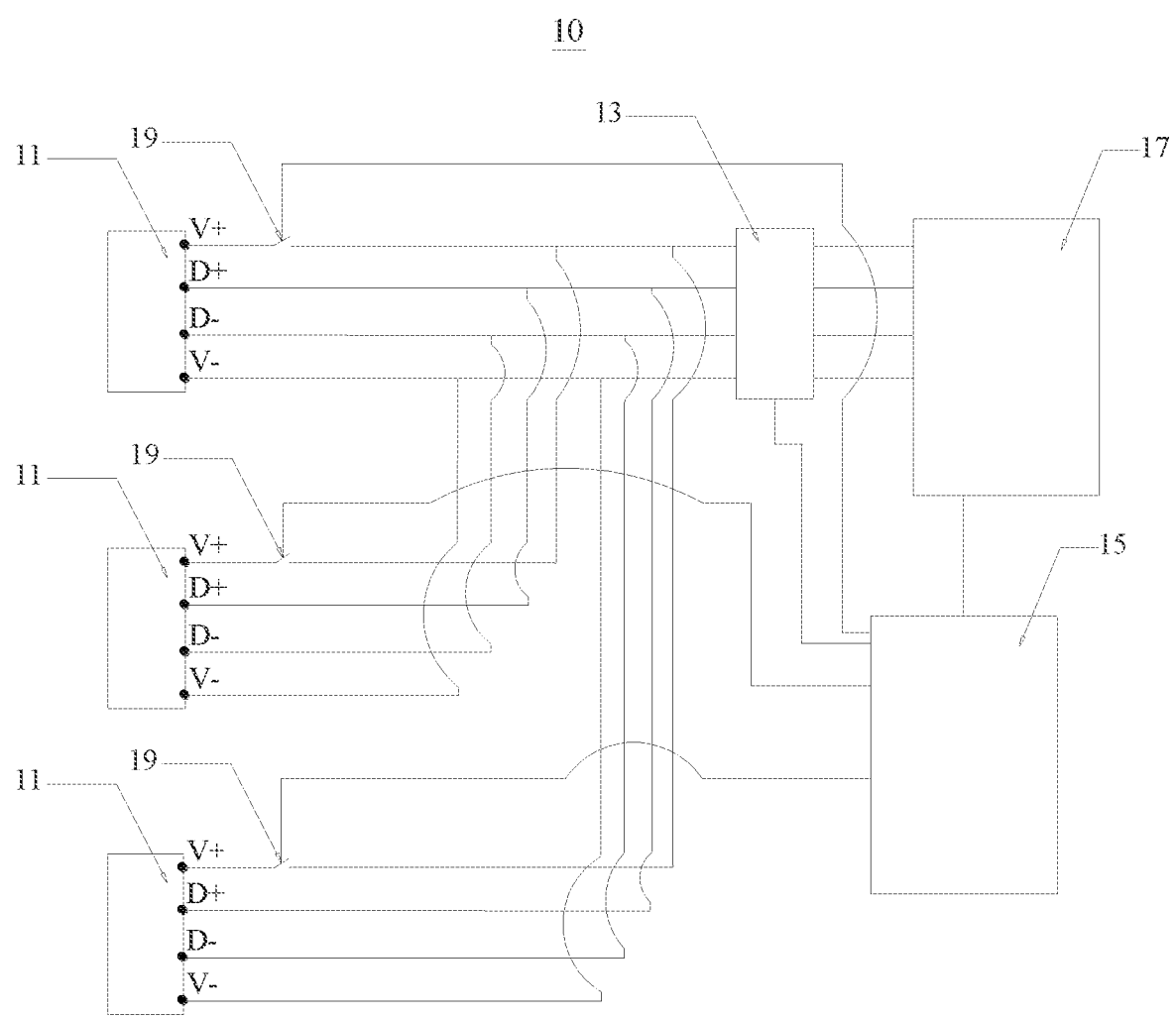
FIG. 3 is a structural diagram of another modified embodiment of the random quick-charging apparatus of the present disclosure.

With reference to FIG. 3, as another variant, the random quick-charging apparatus 10 only comprises one detection unit 13. All branches are co-connected and then sequentially connected to the detection unit 13 and the power supply unit. The detection unit 13 is electrically connected to the controller 15. The detection unit 13 may detect whether there is an electronic device electrically inserted into the interface 11 on any branch and generates a feedback signal for transmission to the controller 15. The controller 15 controls the power supply unit 17 to perform handshake identification with the electronic device so as to acquire quick-charging information of the electronic device. The power supply unit 17 correspondingly outputs a power source signal according to quick-charging demands fed back by the electronic device.

In the present disclosure, a quick-charging voltage is an output voltage that satisfies the quick-charging demands of the electronic device. The conventional output voltage is a working voltage required by an ordinary-charging state of the electronic device and is less than the quick-charging voltage. For example, the conventional output voltage of the electronic device is 5V, whereas the quick-charging voltage is any voltage solution for achieving quick charging, such as 10V, 12V or 24V.

The working process of the random quick-charging apparatus 10 of the present disclosure is as follows.

When a first electronic device is randomly inserted into one interface 11, the detection unit 13 on the branch where the interface 11 is located may detect that there is an electronic device electrically inserted and generates a feedback signal for transmission to the controller 15; the controllers 15 controllers the power supply unit 17 to perform handshake identification with the inserted electronic device, and controls the switch 19 to be turned on or turned off at the same time; after completion of the handshake identification, the power supply unit 17 correspondingly outputs the power source signal according to the quick-charging demands of the electronic device; and the controller 15 controls the switch 19 to be turned on, thereby achieving quick charging of the electronic device.

When a second electronic device is inserted into a second interface 11, the detection unit 13 on the branch where the interface 11 is located detects the electrical insertion of the second electronic device and feeds back a signal to the controller 15; and the controller 15 controls the power supply unit 17 to output the conventional output voltage; and the two electronic devices inserted into the two interfaces 11 respectively are ordinarily charged according to the conventional output voltage.

When an N-th electronic device is inserted into an N-th interface 11 (N>2, and N is an integer), the detection unit 13 on the branch where the interface 11 is located detects the electrical insertion of the N-th electronic device and then feeds back a detection result to the controller 15; the controller 15 controls the power supply unit 17 to directly output an adjusted voltage to the N-th electronic device; and voltage adjustment is no longer performed, and all interfaces 11 perform ordinary charging according to the decreased output voltage.

For the random quick-charging apparatus 10 of the present disclosure, after the second electronic device is inserted, the output voltage is decreased immediately and the power supply unit 17 performs ordinary charging on the two electronic devices so as to avoid the failure and even fire breakout of the random quick-charging apparatus 10 itself caused by too high output power and excessive generated heat energy of the power supply unit 17, and the random quick-charging apparatus has high safety performance.

As an alternative, when a first electronic device electrically inserted does not support quick charging, the power supply unit 17 cannot perform handshake identification with the electronic device and thus cannot acquire quick-charging demands of the electronic device; and the power supply unit 17 outputs a set conventional voltage value to the electronic device for ordinary charging, wherein this conventional voltage value does not exceed the maximum voltage value that electronic devices on the market may withstand. However, when an electronic device inserted subsequently supports quick charging, the power supply unit 17 may preform shake identification with the electronic device inserted subsequently, and correspondingly adjusts and outputs a power source signal according to quick-charging demands of the electronic device, thereby satisfying the quick-charging demands of the electronic device. The random quick-charging apparatus 10 may satisfy the quick-charging demands and is not limited to the condition that the electronic device inserted firstly must support the quick charging.

As another alternative, when the first electronic device electrically inserted does not support quick charging, but the electronic device inserted subsequently supports quick charging, the random quick-charging apparatus 10 no longer performs handshake identification with the electronic device inserted subsequently, and directly outputs the set conventional output voltage to the electronic devices for ordinary charging. When the quick-charging demands of one electronic device are satisfied, and this output voltage exceeds the maximum voltage that the other electronic device may withstand, the problems of line fault and even damage to the electronic device may be caused easily. The random quick-charging apparatus 10 of this embodiment avoids the occurrence of these problems by making all interfaces 11 perform ordinary charging according to the set conventional output voltage.

Figure 4:
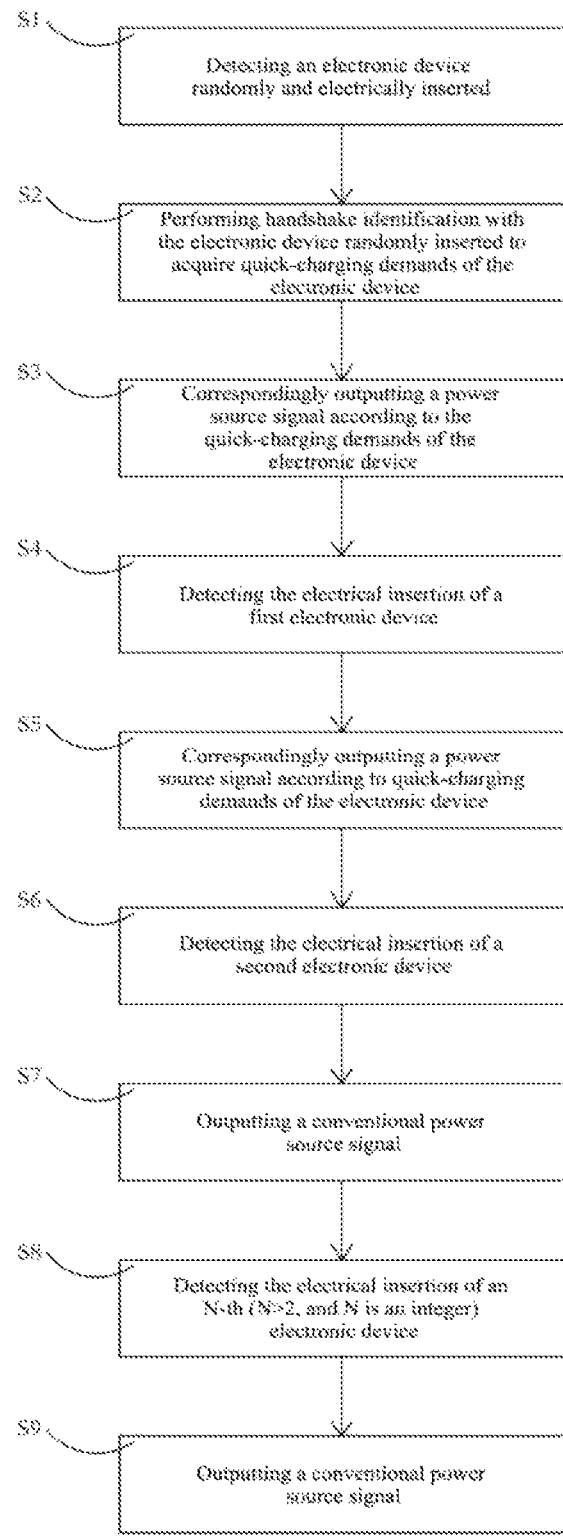
FIG. 4 is a flow chart of a random quick-charging method of the present disclosure.

With reference to FIG. 4, the present disclosure further provides a random quick-charging method for quick charging of an electronic device, which comprises the following steps.

In step S1, an electronic device randomly and electrically inserted is detected;

in step S2, handshake identification is performed with the electronic device randomly inserted to acquire quick-charging demands of the electronic device; and in step S3, a power source signal is correspondingly output according to the quick-charging demands of the electronic device.

Preferably, the random quick-charging method of the present disclosure further comprises the following steps:

in step S4, the electrical insertion of a first electronic device is detected; and in step S5, a power source signal is correspondingly output according to quick-charging demands of the electronic device.

Preferably, the random quick-charging method of the present disclosure further comprises the following steps:

in step S6, the electrical insertion of a second electronic device is detected; and in step S7, a conventional power source signal is output.

Further preferably, the random quick-charging method of the present disclosure further comprises the following steps:

in step S8, the electrical insertion of an N-th (N>2, and N is an integer) electronic device is detected; and in step S9, a conventional power source signal is output.

Compared with the prior art, the random quick-charging apparatus for quick charging of the electronic device of the present disclosure comprises the at least two branches, the power supply unit, the detection unit, and the controller, wherein the at least two branches are electrically connected to the power supply unit; the detection unit is electrically connected to the controller; the controller is electrically connected to the power supply unit; the interface is arranged on each branch; the detection unit detects whether there is the electronic device electrically inserted into the interface of any branch and generates the feedback signal for transmission to the controller; the controller controls the power supply unit to perform handshake identification with the electronic device inserted into the interface of any branch; and the power supply unit correspondingly outputs the power source signal according to the quick-charging demands of the electronic device. The electronic device may be randomly inserted into any interface of the random quick-charging apparatus to achieve the quick-charging function without being inserted into the fixed interface to achieve the quick charging, and thus high convenience in use is achieved. Particularly in the field of vehicle-mounted chargers, it is inconvenient for a user to distinguish which one is the designated quick-charging interface and which one is not the quick-charging interface when the user is driving a vehicle, and the random quick-charging apparatus of the present disclosure provides a blind insertion mode, and thus the user may use the charging apparatus more conveniently and safely.

In addition, for the random quick-charging apparatus of the present disclosure, when the second electronic device is inserted into the other interface, the detection unit detects the insertion of the second electronic device and generates the feedback signal for transmission to the controller; and the controller controls, according to the feedback signal, the power source signal output by the power supply unit to be the conventional power source signal. The random quick-charging apparatus of the present disclosure may not only guarantee the quick-charging function, but also avoid the occurrence of an unsafe accident of charging apparatus explosion or user burn caused by too high output power and excessive generated heat energy when a plurality of interfaces is used for quick charging at the same time, and thus has high safety performance.

Compared with the prior art, the random quick-charging method for quick charging of the electronic device of the present disclosure comprises the following steps:

detecting the electronic device randomly and electrically inserted;

performing handshake identification with the electronic device randomly inserted to acquire the quick-charging demands of the electronic device; and correspondingly outputting the power source signal according to the quick-charging demands of the electronic device.

By adopting the random quick-charging method of the present disclosure, the electronic device may be randomly inserted to achieve the quick-charging function without being inserted into the fixed quick-charging interface to achieve the quick charging and thus high convenience in use is achieved. In addition, the present disclosure also provides such a solution that the charging demands of a device to be charged under a specific protocol are confirmed according to a feedback signal after the device to be charged is inserted, and then different voltage signals may be provided for charging apparatuses operating under different charging protocols.

In addition, in the random quick-charging method of the present disclosure, when it is detected that more than one electronic devices are inserted at the same time, the conventional power source signal is output, thereby avoiding the safety problems of fire breakout, explosion and the like caused by too high output power and excessive generated heat energy of the power source when two or more electronic devices are quickly charged at the same time, and the random quick-charging method has high safety performance.

The above description is only preferred embodiments of the present disclosure and is not intended to limit the present disclosure. Any modifications, equivalent replacements, improvements and the like made within the principles of the present disclosure should be comprised within the scope of protection of the present disclosure.

The invention claimed is:

1. A random quick-charging apparatus for quick charging of an electronic device, comprising: at least two branches, a power supply unit, a detection unit, and a controller, wherein the at least two branches are electrically connected to the power supply unit; the detection unit is electrically connected to the controller; the controller is electrically connected to the power supply unit; one interface is arranged on each branch; the detection unit detects whether there is a first electronic device electrically inserted into anyone interface of the at least two branches and generates a feedback signal for transmission to the controller; the controller controls the power supply unit to perform handshake identification with the first electronic device inserted into anyone interface of the at least two branches; and the power supply unit correspondingly outputs a power source signal according to quick-charging demands of the first electronic device; wherein the interface comprises four electrodes, i.e., D+, D−, V+, and V−; the D+, D−, V+, and V− electrodes are sequentially connected to the detection unit and the power supply unit; the D+, D−, V+, and V− electrodes of each interface are co-connected to D+, D−, V+, and V− electrodes of another interface of the at least two branches in a one-to-one correspondence manner; or the interface comprises six electrodes, i.e., D+, D−, V+, V−, CC1 and CC2; the D+, D−, V+, V−, CC1 and CC2 electrodes are sequentially connected to the detection unit and the power supply unit; and the D+, D−, V+, V−, CC1 and CC2 electrodes of each interface are co-connected to D+, D−, V+, V−, CC1 and CC2 electrodes of another interface of the at least two branches in a one-to-one correspondence manner.

2. The random quick-charging apparatus according to claim 1, comprising at least three branches, wherein when a third electronic device is inserted, the detection unit detects the electrical insertion of the third electronic device and generates a feedback signal to the controller; and the controller controls, according to the feedback signal, the power supply unit to directly output a conventional power source signal.

3. The random quick-charging apparatus according to claim 1, wherein the number of the detection units is at least two; one detection unit is arranged on each branch; the detection unit is connected to the interface at one end, and connected to the power supply unit at the other end; and the detection unit detects whether there is an electronic device electrically inserted into the interface of the branch where the detection unit is located.

4. The random quick-charging apparatus according to claim 1, wherein the power supply unit performs handshake identification with a first electronic device inserted into the interface of any branch, and when the first electronic device supports quick charging, the power supply unit correspondingly outputs a power source signal according to quick-charging demands of the electronic device; and when the first electronic device does not support quick charging, the power supply unit cannot acquire the quick-charging demands of the electronic device, outputs a conventional power source signal to the electronic device and thus performs ordinary charging on the inserted electronic device.

5. The random quick-charging apparatus according to claim 1, wherein the random quick-charging apparatus is a mobile power source or a vehicle-mounted charger.

6. The random quick-charging apparatus according to claim 1, wherein the electronic device is a mobile phone, rechargeable earphones, a tablet computer or a laptop computer.

7. A random quick-charging method for quick charging of an electronic device employing the random quick-charging apparatus of claim 1, comprising the following steps:
   detecting a first electronic device which is randomly and electrically inserted;
   performing handshake identification with the first electronic device randomly inserted so as to acquire quick-charging demands of the first electronic device; and
   correspondingly outputting a power source signal according to the quick-charging demands of the first electronic device;
   detecting the electrical insertion of a second electronic device; and
   outputting a conventional power source signal.

8. The random quick-charging method according to claim 7, further comprising the following steps:
   detecting the electrical insertion of an N-th (N>2, and N is an integer) electronic device; and
   outputting a conventional power source signal.

9. The random quick-charging apparatus according to claim 1, wherein when a second electronic device is inserted into another interface of the at least two branches, the detection unit detects the insertion of the second electronic device and generates a feedback signal for transmission to the controller; and the controller controls, according to the feedback signal, a power source signal output by the power supply unit to be a conventional power source signal.

* * * * *